Patented May 31, 1949

2,471,789

UNITED STATES PATENT OFFICE 2,471,789

RUBBER PLASTICIZER COMPOSITION

Frank J. Soday, Baton Rouge, La., assignor to The United Gas Improvement Company, a corporation of Pennsylvania No Drawing. Original application February 20, 1943, Serial No. 476,638. Divided and this application July 6, 1946, Serial No. 681,760

20 Claims. (Cl. 260—31.6)

This application is a division of my copending application Serial Number 476,638, now abandoned, filed February 20, 1943.

The present invention relates to new compositions of matter, and to methods for their preparation.

More particularly, this invention relates to products containing diesters of nuclear-substituted styrene glycols as plasticizers, and to methods for the preparation of these products.

An object of the present invention is the provision of new compositions of matter plasticized with diesters of nuclear-substituted styrene glycols. A further object of the invention is the provision of compounds useful as plasticizing agents for a variety of products. Other objects and advantages of the invention will be apparent to those skilled in the art from an inspection of the following description and claims.

I have discovered that diesters of glycols of nuclear-substituted styrene having the following formula

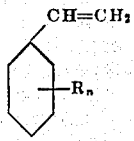

in which R represents an alkyl group, such as methyl, ethyl, propyl, butyl, or amyl; an aryl group, such as a phenyl group; an alkyl-aryl group, such as a tolyl, xylyl, or similar group; and/or an aryl-alkyl group, such as a phenyl methyl ($C_6H_5CH_2$—) group; and in which $n$ indicates that from 1 to 5 of such groups may be present on the benzene nucleus, can be prepared in good yields from derivatives of such nuclear-substituted styrenes by methods to be more particularly described hereinafter.

I have discovered further that such esters, which may be represented by the following structural formula

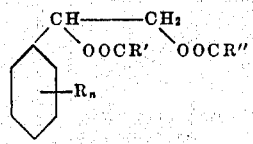

in which R and $n$ have the same meaning as before and R' and R'' each represent one of a group comprising hydrogen; alkyl, such as methyl, ethyl, propyl, butyl, amyl, and the like; substituted alkyl, such as halogen-substituted groups, for example chloro-methyl, and chloroethyl, hydroxy-substituted groups, for example hydroxy-methyl and hydroxyethyl, amino-substituted groups, for example amino-methyl and amino-ethyl, and the like; aryl, such as phenyl; substituted aryl, such as chloro-phenyl, hydroxy-phenyl, amino-phenyl, and the like; alkyl-aryl, such as tolyl, xylyl, and the like, substituted alkyl-aryl; aryl-alkyl, such as phenyl-methyl, phenyl-ethyl, and the like; and substituted aryl-alkyl groups, possess properties which make them particularly desirable for use in a number of commercial operations.

The preparation and utilization of alkyl diesters of nuclear-substituted methyl styrene glycols, particularly those having the following structural formula

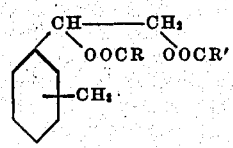

in which the $CH_3$ group is located in the ortho, meta, or para position, and in which R and R' each represent one of a group consisting of methyl, ethyl, propyl, butyl, and amyl, is a preferred embodiment of this invention.

The preparation of diesters of nuclear-substituted styrene glycols may be carried out in a number of ways. However, I generally prefer to react at least one of a group consisting of acid, acid anhydride, acyl halide, and metallic salt with one or more derivatives of the desired nuclear-substituted styrene, or mixture thereof.

Thus, for example, (a) an acid, such as acetic acid, an acid anhydride, such as propionic anhydride, and/or an acyl halide such as butyryl chloride, may be reacted with a glycol of the desired nuclear-substituted styrene to form the diester thereof

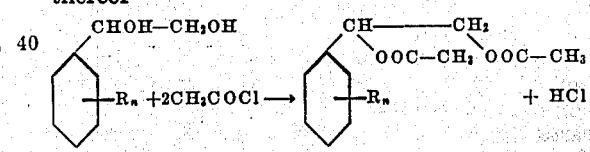

(b) an acid, an acid anhydride, and/or an acyl halide may be reacted with an hydroxy ester (or monoester) of the desired nuclear-substituted styrene

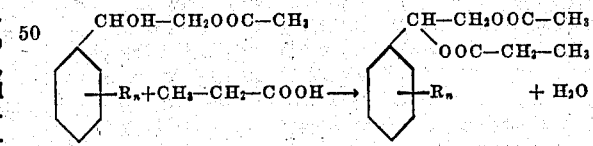

(c) the metallic salt (which term includes the ammonium salt) of the desired acid, or mixture of acids, may be reacted with a haloester of the desired nuclear-substituted styrene

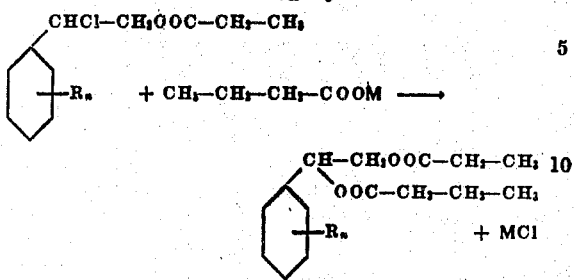

or (d) the metallic salt of the desired acid, or mixture of acids, may be reacted with a dihalide of the desired nuclear-substituted styrene, or mixture thereof

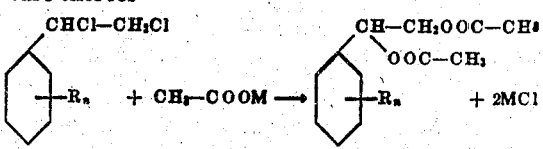

A preferred method for the preparation of diesters of nuclear-substituted styrene glycols comprises the reaction of one or more metallic salts of the desired acid, or mixture of acids, with one or more dihalides, preferably the dichloride, of the desired nuclear-substituted methyl styrene, or mixture thereof.

The use of the alkali or alkaline earth metal salts of such acids, or mixture of acids, is preferred. Excellent results are obtained when the sodium salt of the desired acid is employed.

Pure or relatively pure nuclear-substituted styrenes, mixtures thereof, or mixtures and/or fractions containing one or more nuclear-substituted styrenes, may be employed in the preparation of diesters of the type described herein.

A preferred source of such nuclear-substitued styrenes is the light oil obtained upon the pyrolysis of petroleum or petroleum hydrocarbons at temperatures above 1100° F., and more particularly above 1300° F.

Thus, for example, fractions of such light oil in which the preponderating portion boils within the range of 160 to 180° C., and more particularly within the range of 165 to 175° C., usually contain significant proportions of m-methyl styrene, p-methyl styrene, and o-methyl styrene.

A typical light oil fraction obtained in this manner, in which the major proportion boiled within the range of 167 to 173° C., was analyzed and found to contain m-methyl styrene as the preponderating unsaturated hydrocarbon, folloyed by p-methyl styrene and o-methyl styrene in the order given.

While such fractions may contain any desired proportions of nuclear-substituted methyl styrenes, I generally prefer to employ light oil fraction containing between 10% and 90%, and more particularly between 20% and 80%, of nuclear-substituted styrenes. Fractions in which m-methyl styrene is the preponderating unsaturated hydrocarbon present are preferred.

In the preparation of intermediates such as glycols, halo-esters, hydroxy-esters, and/or dichlorides of the desired nuclear-substituted styrene, or mixtures thereof, I prefer to employ chlorine or chlorine derivatives, such as hydrogen chloride or hypochlorous acid, due to the ease with which the corresponding reactions may be conducted, the lack of side reactions, the excellent yields obtained, and the stable nature of the products.

Typical acids which may be employed in the preparation of esters of the type described include normal fatty acids, such as formic, acetic, propionic, butyric, valeric, caproic, oenanthic, caprylic, pelargonic, capric, undecoic, lauric, tridecoic, myristic, palmitic, margaric, stearic, and similar acids having a higher number of carbon atoms; substituted fatty acids, such as isobutyric, iso-valeric, active valeric, trimethyl acetic, isocaproic, methyl n-propyl acetic, diethyl acetic, sec.-butyl acetic, dimethyl ethyl acetic, tert.-butyl acetic, methyl-iso-propylacetic, and similar acids; unsaturated acids, such as acrylic acid, methacrylic acid, crotonic acid, isocrotonic acid, vinyl acetic acid, and the like; halogenated fatty acids, such as chloroformic acid, monochloro acetic acid, dichloro acetic acid, α-chloropropionic acid, and the like; hydroxy acids, such as glycollic acid, lactic acid, α-hydroxybutyric acid, and the like; amino acids, such as glycine, alanine, valine, leucine, and the like; dibasic acids, such as oxalic acid, malonic acid, methyl malonic acid, succinic acid, maleic acid, fumaric acid, and the like; aromatic carboxylic acids, such as benzoic acid, anthranilic acid, salicylic acid, phthalic acid, and the like; and aryl-substituted aliphatic acids, such as phenyl acetic acid, hydrocinnamic acid, phenyl propionic acid, cinnamic acid.

Of the foregoing the aliphatic monobasic acids, or aliphatic acids containing a single carboxyl group, and particularly the fatty acids, are groups of acids which form excellent esters for my purposes.

Metal salts, particularly alkali and alkaline earth metallic salts, anhydrides, and/or acyl halides also may be used in the preparation of diesters of the type described herein, either alone, or in admixture, or in admixture with one or more free acids.

The use of more than one acid, and/or salts, anhydrides, and/or acyl halides thereof, in reactions of the type described herein usually leads to the production of mixed diesters, which are of value in a number of commercial applications.

As pointed out previously, diesters of nuclear-substituted styrene glycols may be prepared from nuclear-substituted styrene derivatives, such as glycols, hydroxy esters, haloesters, and dihalides.

Nuclear-substituted styrene glycols may be prepared, among other ways, by the hydrolysis of the corresponding halohydrines or oxides. This may be illustrated by means of the following example.

*Example 1*

A 333 gram portion of a light oil fraction obtained by the fractionation of a light oil obtained in the manufacture of oil gas, and containing 260 grams of nuclear substituted methyl styrene, was slowly added to a dilute aqueous solution of hypochlorous acid during a period of one and three quarter hours with good stirring at room temperature.

The reaction mixture was extracted with ether, after which the ether extract was washed with a dilute aqueous solution of sodium carbonate. The mixture was permitted to stratify and the aqueous layer removed and discarded. The ether extract was washed with water until neutral, then dried with anhydrous sodium sulfate. Ether was removed from the crude reaction product by distillation at atmospheric pressure, after which the residual liquid was distilled under reduced pressure. Approximately 200 grams of methyl styrene chlorohydrine was obtained, with the following physical properties.

Boiling range=109–117° C. at 6 mm., absolute
Density $(d_4^{20})$=1.162
Refractive index $(n_D^{20})$=1.547.

A mixture of 171 grams of the methyl styrene chlorohydrine and 660 cc. of a 10% aqueous sodium carbonate solution was heated in an autoclave for a period of 6 hours at a temperature of 120–125° C. The maximum pressure developed was 150 pounds. The product, consisting of a heavy oil, was recovered by extraction with ether, drying, and distilling under reduced pressure.

A total of 100 grams of methyl styrene glycol, representing a yield of 65.8%, was obtained. The product had the following physical properties.

Boiling range @ 2–3 mm. of mercury, absolute=133–137° C.
Density $(d_4^{20})$=1.1132
Refractive index $(n_D^{20})$=1.5472

The nuclear-substituted glycol then may be esterfied by reaction with one or more organic acids, anhydrides, and/or acyl halides, either alone or in conjunction with the use of one or more catalysts, such as mineral acids. Any water formed during the reaction preferably is removed from the reaction zone to assist in the esterification.

Hydroxy esters of nuclear-substituted styrenes may be reacted with one or more acids, anhydrides, and/or acyl halides to form diesters of the type described herein. The reaction may be carried out in the presence of a catalyst, if desired, and any water formed during the reaction may be removed, either continuously or discontinuously, from the reaction zone to assist in the esterification.

Haloesters of nuclear-substituted styrenes, which may be used as intermediates in the preparation of diesters of nuclear-substituted styrene glycols, may be prepared, among other ways, by the reaction of a hypohalous acid, or a compound capable of generating hypohalous acid, and the desired organic acid with one or more nuclear-substituted styrenes. This may be illustrated by means of the following example.

*Example 2*

A 108.5 gram (1 mol) portion of tertiary butyl hypochlorite was slowly added with good stirring to 151 grams of a light oil fraction containing 118 grams (1 mol) of nuclear-substituted methyl styrenes at a temperature of 0° C. This mixture was then slowly added to a 90% aqueous solution of acetic acid, during the course of one hour.

The reaction was continued for an additional period of 11 hours at 0° C., after which the reaction mixture was agitated with 500 cc. of ice water to remove any unreacted tertiary butyl hypochlorite, as well as to remove the tertiary butyl alcohol formed as a by-product of the reaction. The mixture was then permitted to stratify, the water layer removed, and the washing process repeated with an additional 500 cc. portion of ice water. The product was then dried over anhydrous sodium sulfate.

The crude product was distilled at a pressure of 4 mm., absolute, whereupon 79 grams of methyl styrene chloroacetate was obtained. This material had the following physical properties.

Boiling point=115–121° C. @ 4 mm.
Density $(d_4^{20})$=1.1360
Refractive index $(n_D^{20})$=1.52150
Chlorine content (analysis)=16.8% by weight
Theoretical chlorine content=16.7% by weight The product was a pale yellow, viscous liquid with an agreeable odor. It consisted mainly of the β-chloro isomer.

The haloesters of nuclear-substituted styrenes then may be converted, among other ways, to the desired diester by reaction with the metallic salts of one or more acids, either alone or in the presence of suitable solvents, such as one or more organic acids.

A preferred method for the preparation of diesters of nuclear-substituted styrene glycols comprises reacting the metallic salts of one or more acids with the dihalide, and particularly the dichloride, of the desired nuclear-substituted styrene, or mixture thereof.

Dihalides of nuclear-substituted styrenes may be prepared by the direct addition of the desired halide, or mixture of halides, to the nuclear-substituted styrene, or mixture thereof. This may be illustrated by means of the following examples.

*Example 3*

A hydrocarbon fraction containing para-methyl styrene was secured by the distillation of light oil obtained in the manufacture of oil gas. This fraction had the following properties.

5% boiling point—169.0° C. @ 760 mm.
50% boiling point—169.8° C. @ 760 mm.
90% boiling point—172.6° C. @ 760 mm.
Density $(d_4^{20})$=0.8941
Refractive index $(n_D^{20})$=1.5239.
Unsaturation=58.0% (McIlhiney bromination method)

A quantity representing 1050 parts by weight of the para-methyl styrene fraction was washed with a small quantity of a 10% potassium hydroxide solution to remove impurities such as phenolic compounds. After removal of the potassium hydroxide solution, the hydrocarbon fraction was washed with water until the washings were neutral to litmus. The para-methyl styrene fraction was then dissolved in 800 parts by weight of carbon tetrachloride. Any other suitable solvent might have been employed. This mixture was dried with anhydrous magnesium sulfate, filtered to remove all solid materials, and cooled to a temperature of −10° C. Chlorine was slowly run into the solution, with continuous stirring, until hydrogen chloride was evolved when the chlorination was terminated. A total of approximately 310 parts by weight of chlorine was added during the period of chlorination, which lasted approximately ten hours. The reaction mixture was then allowed to come to room temperature and the acidic constituents removed by adding a small quantity of calcium carbonate. Anhydrous magnesium sulfate was added to the reaction mixture to remove any moisture present and the material was subsequently filtered. Carbon tetrachloride was removed by distillation under reduced pressure. The chlorinated fraction remaining after the removal of the carbon tetrachloride amounted to 1125 parts by weight.

To separate the para-methyl styrene dichloride contained within this mixture, the chlorinated fraction was fractionally distilled at a pressure of between 4.0 and 6.5 mm. of mercury, absolute, in a small diameter packed fractionating column using a 7:1 reflux ratio, the fractionating efficiency being equivalent to 10 theoretical plates. A total of 345 parts by weight of para-methyl styrene dichloride boiling between 94 and 102° C. at approximately 4 mm. of mercury, absolute, was obtained by this fractionation.

*Example 4*

A hydrocarbon fraction containing meta-methyl styrene was secured by the distillation of light oil obtained in the manufacture of oil gas. This fraction had the following properties.

5% boiling point=172.8° C.@760 mm.
50% boiling point=174.1° C.@760 mm.
90% boiling point=176.3° C.@760 mm.
Density $d_4^{20}$=0.9144
Refractive index $n_D^{20}$=1.5322
Unsaturation=63.9% (McIlhiney bromination method)

A quantity representing 1120 parts by weight of the meta-methyl styrene fraction was washed with a small quantity of a 10% potassium hydroxide solution to remove impurities such as phenolic compounds. After removal of the potassium hydroxide solution, the hydrocarbon fraction was washed with water until the washings were neutral to litmus. The meta-methyl styrene fraction was then dried with anhydrous magnesium sulfate, after which it was dissolved in 1115 parts by weight of recently dried carbon tetrachloride and cooled to a temperature of —10° C. Any other suitable solvent might have been employed. Chlorine was slowly run into the solution, with continuous stirring, until hydrogen chloride was evolved when the chlorination was terminated. A total of approximately 460 parts by weight of chlorine was added during the period of chlorination. The reaction mixture was then allowed to come to room temperature and the acidic constituents removed by adding a small quantity of calcium carbonate. Anhydrous magnesium sulfate was added to the reaction mixture to remove any moisture present and the material was subsequently filtered. Carbon tetrachloride was removed by distillation under reduced pressure. The chlorinated fraction remaining after the removal of the carbon tetrachloride amounted to 1460 parts by weight.

In order to remove any unstable chlorides from the reaction mixture, it was completely distilled at a pressure between 4 and 6 mm. of mercury, absolute. Approximately 1250 grams of distillate was thus secured.

To separate the meta-methyl styrene dichloride contained within this mixture, the chlorinated fraction was fractionally distilled at a pressure of between 2.0 and 4.5 mm. of mercury, absolute, in a small diameter packed fractionating column containing 10 theoretical plates, using a 7:1 reflux ratio. A total of 325 parts by weight of pure meta-methyl styrene dichloride boiling between 94 and 99° C. at 3 to 4 mm. of mercury absolute, was obtained by this fractionation.

Dihalides of nuclear-substituted styrenes may be converted to the corresponding glycol diesters, among other ways, by reaction with the metallic salts of one or more organic acids. This may be illustrated by means of the following example.

*Example 5*

378 gram portion of a mixture of nuclear-substituted methyl styrene dichlorides, containing m-methyl styrene dichloride, p-methyl styrene dichloride, and o-methyl styrene dichloride, was added slowly with good agitation to a mixture of 410 grams of freshly fused sodium acetate and 500 grams of glacial acetic acid at a temperature of 100–140° C. The reaction was contined for a period of 5 hours, after which the mixture was cooled, filtered to remove all solid extraneous material, and distilled to remove the acetic acid present.

The residue was neutralized, extracted with ether, and the ether extract dried and distilled under reduced pressure. A total of 323 grams of methyl styrene glycol diacetate having the following physical properties was obtained.

Boiling range @ 2 mm. of mercury, absolute=122–127° C.
Density $(d_4^{20})$=1.1196
Refractive index $(n_D^{20})$=1.50500.

The diesters of nuclear-substituted methyl styrene glycols are, in general, practically colorless fluids possessing very pleasant odors.

The properties of diesters of nuclear-substituted styrene glycols, and particularly the alkyl esters, which render them particularly desirable for use as plasticizing agents are (1) their unusually good solubility characteristics, rendering them compatible with a wide variety of plasticizable materials, (2) their chemically inert nature, resulting in the production of very stable compositions, (3) their relatively high boiling point or ranges, retarding or preventing blushes, bleeding, blooming, and the like, (4) their colorless and color-stable properties, (5) the ease with which they may be incorporated in plastic compositions, and (6) their low viscosity characteristics.

Diesters of nuclear-substituted styrene glycols are excellent plasticizing agents for natural, and particularly for synthetic, rubber or elastomers.

Examples of the rubber or rubber-like materials with which diesters of the type described herein may be compounded are the various grades and types of natural rubber and rubber-like materials, and synthetic rubbers or elastomers, such as, for example, those obtained by the polymerization of one or more diolefines, or substituents thereof, such as butadiene, isoprene, piperylene, 2-chlorobutadiene, and the like, either alone, or in admixture or in combination with one or more unsaturated and/or reactive compounds or materials such as olefines, unsaturated nitriles, acids, esters, ethers, ketones, aldehydes, and/or substituents thereof, such as, for example, styrene, acrylic nitrile, isobutylene, acrylic esters, and the like. Important examples of synthetic rubbers or elastomers are those obtained by the copolymerization of one or more diolefines with (1) acrylic nitrile, (2) styrene or substituents thereof, and/or (3) isobutylene or similar olefines. These materials are known in the art under different trade names, such as, for example, Buna, Buna S, Buna N, Perbunan, Chloroprene, Neoprene, Ameripol, Hycar, Butyl rubber (isoprene-isobutylene copolymer containing from 1 to 20% of isoprene, usually 8 to 14%), and the like.

Synthetic rubbers of the type obtained by the reaction of dihalides with organic or inorganic sulfides or polysulfides also are included, such as, for example, the material prepared by the reaction of ethylene dichloride with sodium tetrasulfide and sold under the trade name, Thiokol.

The quantity of diesters of the type described herein which may be incorporated in natural or synthetic rubbers, or elastomers, may be varied over very wide limits, depending upon the properties desired. Thus, for example, quantities by weight varying from a few percent, such as 2%, or less, to an amount equal to, or greater than, the quantity of rubber, or rubber mixture, employed in the composition, may be used. For example, from 2% to 50% by weight based on the rubber, and particularly from 2% to 30%, such as from 5% to 20%, by weight based on the weight of the rubber, may be employed.

In addition to diesters of the type described herein, other ingredients which may be incorporated in natural rubber and/or synthetic rubber compositions include vulcanizing agents and/or accelerators, such as for example, sulfur or sulfur-containing compounds such as tetramethylthiuram disulfide, mercaptoarylenethiazoles, such as mercaptobenzothiazole, benzothiazyl disulfide, litharge, and dithio carbamates; pigments, such as for example, magnesium oxide, zinc oxide, and lead oxide; antioxidants, such as, for example, phenyl-alpha-naphthylamine (Neozone A), and phenyl-beta-naphthylamine (Neozone D); reinforcing pigments, such as, for example, carbon blacks, such as channel black, clay, and blanc fixe; fillers and/or diluents, such as, for example, lithopone, barytes, whiting, and asbestine; other softeners and plasticizing agents such as, for example, paraffin wax, factice, dibutylphthalate, tricresyl phosphate, pine oil, oils, fatty acids, and synthetic or natural resins or resinous materials.

A preferred embodiment of the invention is the use of diesters of the type described in conjunction with resins, such as those derived by the polymerization of light oil and/or coal tar fractions containing coumarone and/or indene or the resins derived by the polymerization of the high-boiling monomeric material derived from tar by flash distillation and/or solvent extraction processes; and/or other organic liquids, such as the high boiling aromatic oils derived by the flash distillation and/or solvent extraction of tar, as softening agents for natural and/or synthetic rubber.

Another preferred embodiment of this invention is the use of diesters of the type described in combination with one or more resinous materials as a softener for natural and/or synthetic rubber compositions. A resin which may be incorporated with the diester is the resin obtained by the polymerization, by thermal and/or catalytic methods, of certain high boiling monomeric material separated in monomeric form from tar formed during the production of combustible gas by processes involving the pyrolytic decomposition of petroleum oil with or without the aid of catalysts. As pointed out previously, such resins may be formed in situ in aromatic oils of similar type.

Another desired resin which may be incorporated in the diesters as softeners for natural and/or synthetic rubber is the resin derived by the polymerization of petroleum and/or coal tar fractions containing indene and/or coumarone.

Other desirable ingredients which may be blended with a diester of the type described either alone or in combination with one or more resinous materials, as a softener for natural and/or synthetic rubber include the dimers of petroleum or coal tar fractions containing indene and/or coumarone, dibutyl phthalate, tricresyl phosphate, and pine oil.

Reclaimed rubber is also included among the materials which may be plasticized with the diesters herein described, together with natural and/or synthetic rubber, and with or without other ingredients.

The diester or diesters, and other ingredients, may be mixed or compounded with the natural rubber and/or synthetic rubber on mixing or compounding rolls or mills, or they may be compounded by any other method known in the art. The rubber composition then may be vulcanized, if desired, by any of the methods employed for this purpose in the art.

Examples of rubber compositions containing diesters of the type described herein are as follows.

*Example 8*

| Component: | Parts by weight |
| --- | --- |
| Natural rubber | 100 |
| Methyl styrene glycol diacetate | 10 |
| Zinc oxide | 5 |
| Sulfur | 2.5 |
| Mercaptobenzothiazole | 0.8 |

*Example 9*

| Component: | Parts by weight |
| --- | --- |
| Pale crepe rubber | 100 |
| Zinc oxide | 45 |
| Sulfur | 2.5 |
| Resin obtained from monomeric material boiling above 210° C. and isolated from petroleum tar | 5 |
| Methyl styrene glycol diester | 5 |
| Mercapto benzothiazole | 0.6 |
| Stearic acid | 2 |

*Example 10*

A natural rubber tire tread mix may be compounded as follows:

| Component: | Parts by weight |
| --- | --- |
| Smoked sheet rubber | 100 |
| Channel black | 40 |
| Zinc oxide | 6 |
| Methyl styrene glycol diester | 2 |
| Resin obtained from monomeric material boiling above 210° C. and isolated from petroleum tar | 2 |
| Sulfur | 3 |
| Stearic acid | 2 |
| Mercapto benzothiazole | 0.7 |

*Example 11*

A synthetic rubber tire tread mix may be compounded as follows:

| Component: | Parts by weight |
| --- | --- |
| Neoprene | 100 |
| Zinc oxide | 5 |
| Mercaptobenzothiazole | 1.25 |
| Channel black | 45 |
| Methyl styrene glycol diester | 4 |
| Phenyl-α-naphthylamine | 2 |
| Sulfur | 1.25 |

*Example 12*

| Component: | Parts by weight |
| --- | --- |
| Buna S | 80 |
| Plantation crepe | 20 |
| Zinc oxide | 5 |
| Channel black | 50 |
| Age Rite Resin D | 2 |
| Pine tar | 4 |
| Methyl styrene glycol diacetate | 3 |
| Stearic acid | 2 |
| Sulfur | 1.5 |
| Altax | 2 |

Example 13

| Component: | Parts by weight |
|---|---|
| Butadiene-styrene rubber | 100 |
| Methyl styrene glycol diester | 3 |
| Resin obtained from monomeric material boiling above 210° C. and isolated from petroleum tar | 3 |
| Carbon black | 40 |
| Sulfur | 1.25 |
| Mercaptobenzothiazole | 1.25 |
| Zinc oxide | 5 |
| Phenyl-α-naphthylamine | 1 |

Example 14

| Component: | Parts by weight |
|---|---|
| Butadiene-acrylic nitrile rubber | 100 |
| Methyl styrene glycol diester | 2 |
| Resin obtained from monomeric material boiling above 210° C. and isolated from petroleum tar | 3 |
| Carbon black | 30 |
| Sulfur | 1.5 |
| Mercaptobenzothiazole | 1.5 |
| Zinc oxide | 15 |
| Phenyl-α-naphthylamine | 2 |

Example 15

| Component: | Parts by weight |
|---|---|
| Isoprene-isobutylene rubber | 100 |
| Methyl styrene glycol diester | 5 |
| Resin obtained from monomeric material boiling above 210° C. and isolated from petroleum tar | 5 |
| Carbon black | 15 |
| Sulfur | 1.25 |
| Mercaptobenzothiazole | 1.25 |
| Phenyl-α-naphthylamine | 1 |
| Zinc oxide | 20 |

Example 16

| Component: | Parts by weight |
|---|---|
| Perbunan | 100 |
| Zinc oxide | 5 |
| Benzothiazyl disulfide | 1.5 |
| Sulfur | 1.5 |
| Phenyl-β-naphthylamine | 1 |
| Channel black | 50 |
| Stearic acid | 1 |
| Methyl styrene glycol diester | 50 |

The foregoing compositions may be sheeted out, shaped and vulcanized if desired, such as by the application of a temperature of, say, 140° C. in a press for a period of, say, 45 minutes. Other procedures may, of course, be used if desired.

Rubber-nuclear-substituted styrene diester compositions of the type described, either as such or with the incorporation of other ingredients such as the resin and/or aromatic oil derived from monomeric material boiling above 210° C. and isolated from petroleum tar, may be used for a variety of purposes, such as for the manufacture of tires, tubes, and other objects, and as adhesives, coating, impregnating, and waterproofing agents. Such compositions may or may not be vulcanized prior to, during, or subsequent to the use thereof.

The term "rubber-like polymers of butadiene-1,3, isoprene, piperylene, and 2-chlorobutadiene-1,3," when used in the claims is intended to be generic in character, and to embrace not only rubber-like polymers of the individual compounds named taken alone, but also when in admixture with each other, as well as when in admixture with other unsaturated and/or reactive compounds capable of combining with the named compounds to form rubber-like polymers.

While various procedures and formulas have been particularly described these are of course subject to considerable variation. Therefore, it will be understood that the foregoing specific examples are given by way of illustration, and that changes, omissions, additions, substitutions, and/or modifications might be made within the scope of the claims without departing from the spirit of the invention.

I claim:

1. A new composition of matter, comprising rubber selected from the group consisting of natural rubber and rubber-like polymers of butadiene-1,3, isoprene, piperylene and 2-chlorobutadiene-1,3, and as a plasticizer therefor a diester of styrene glycol having a nuclearly substituted hydrocarbon group, the said plasticizer being included in a quantity equal to from 2% to 50% the weight of the said selected rubber.

2. A new composition of matter, comprising rubber selected from the group consisting of natural rubber and rubber-like polymers of butadiene-1,3, isoprene, piperylene and 2-chlorobutadiene-1,3, and as a plasticizer therefor a diester of alkyl phenyl ethylene glycol in which said alkyl substituent appears on the ring, the said plasticizer being included in a quantity equal to from 2% to 50% the weight of the said selected rubber.

3. A new composition of matter, comprising rubber selected from the group consisting of natural rubber and rubber-like polymers of butadiene-1,3, isoprene, piperylene and 2-chlorobutadiene-1,3, and as a plasticizer therefor a diester of tolyl ethylene glycol, the said plasticizer being included in a quantity equal to from 2% to 50% the weight of the said selected rubber.

4. A new composition of matter, comprising rubber selected from the group consisting of natural rubber and rubber-like polymers of butadiene-1,3, isoprene, piperylene and 2-chlorobutadiene-1,3, and as a plasticizer therefor an aliphatic monobasic acid diester of alkyl phenyl ethylene glycol in which said alkyl substituent appears on the ring, the said plasticizer being included in a quantity equal to from 2% to 50% the weight of the said selected rubber.

5. A new composition of matter, comprising rubber selected from the group consisting of natural rubber and rubber-like polymers of butadiene-1,3, isoprene, piperylene and 2-chlorobutadiene-1,3, and as a plasticizer therefor a fatty acid diester of tolyl ethylene glycol, the said plasticizer being included in a quantity equal to from 2% to 50% the weight of the said selected rubber.

6. A new composition of matter, comprising rubber selected from the group consisting of natural rubber and rubber-like polymers of butadiene-1,3, isoprene, piperylene and 2-chlorobutadiene-1,3, and as a plasticizer therefor a fatty acid diester of tolyl ethylene glycol in which each acid radical has less than 7 carbon atoms, the said plasticizer being included in a quantity equal to from 2% to 50% the weight of the said selected rubber.

7. A new composition of matter, comprising rubber selected from the group consisting of natural rubber and rubber-like polymers of butadiene-1,3, isoprene, piperylene and 2-chlorobutadiene-1,3, and as a plasticizer therefor the acetic acid diester of tolyl ethylene glycol, the said plasticizer being included in a quantity equal to from 2% to 50% the weight of the said selected rubber.

8. A new composition of matter, comprising butadiene-styrene copolymer rubber, and as a plasticizer therefor a fatty acid diester of tolyl ethylene glycol in which each acid radical has less than 7 carbon atoms, the said plasticizer being included in a quantity equal to from 2% to 50% the weight of the said butadiene-styrene copolymer rubber.

9. A new composition of matter, comprising butadiene-acrylic nitrile copolymer rubber, and as a plasticizer therefor a fatty acid diester of tolyl ethylene glycol in which each acid radical has less than 7 carbon atoms, the said plasticizer being included in a quantity equal to from 2% to 50% the weight of the said butadiene-acrylic nitrile copolymer rubber.

10. A new composition of matter, comprising isoprene-isobutylene copolymer rubber, and as a plasticizer therefor a fatty acid diester of tolyl ethylene glycol in which each acid radical has less than 7 carbon atoms, the said plasticizer being included in a quantity equal to from 2% to 50% the weight of the said isoprene-isobutylene copolymer rubber.

11. A new composition of matter, comprising butadiene-styrene copolymer rubber, and as a plasticizer therefor the acetic acid diester of tolyl ethylene glycol, the said plasticizer being included in a quantity equal to from 2% to 50% the weight of the said butadiene-styrene copolymer rubber.

12. A new composition of matter, comprising butadiene-acrylic nitrile copolymer rubber, and as a plasticizer therefor the acetic acid diester of tolyl ethylene glycol, the said plasticizer being included in a quantity equal to from 2% to 50% the weight of the said butadiene-acrylic nitrile copolymer rubber.

13. A new composition of matter, comprising isoprene-isobutylene copolymer rubber, and as a plasticizer therefor the acetic acid diester of tolyl ethylene glycol, the said plasticizer being included in a quantity equal to from 2% to 50% the weight of the said isoprene-isobutylene copolymer rubber.

14. A vulcanizate of the composition of claim 1.
15. A vulcanizate of the composition of claim 2.
16. A vulcanizate of the composition of claim 3.
17. A vulcanizate of the composition of claim 4.
18. A vulcanizate of the composition of claim 8.
19. A vulcanizate of the composition of claim 9.
20. A vulcanizate of the composition of claim 10.

FRANK J. SODAY.

REFERENCES CITED

The following references are of record in the file of this patent:

UNITED STATES PATENTS

| Number | Name | Date |
|---|---|---|
| 2,407,183 | Soday | Sept. 3, 1946 |